3,654,073
METHOD OF PRODUCING NONBURNING
PAPER
Edwin W. Lard, Bowie, and Addison C. White, Takoma Park, Md., assignors to W. R. Grace & Co., New York, N.Y.
Filed Dec. 19, 1968, Ser. No. 785,207
Int. Cl. D21h 5/18
U.S. Cl. 162—145                                                                11 Claims

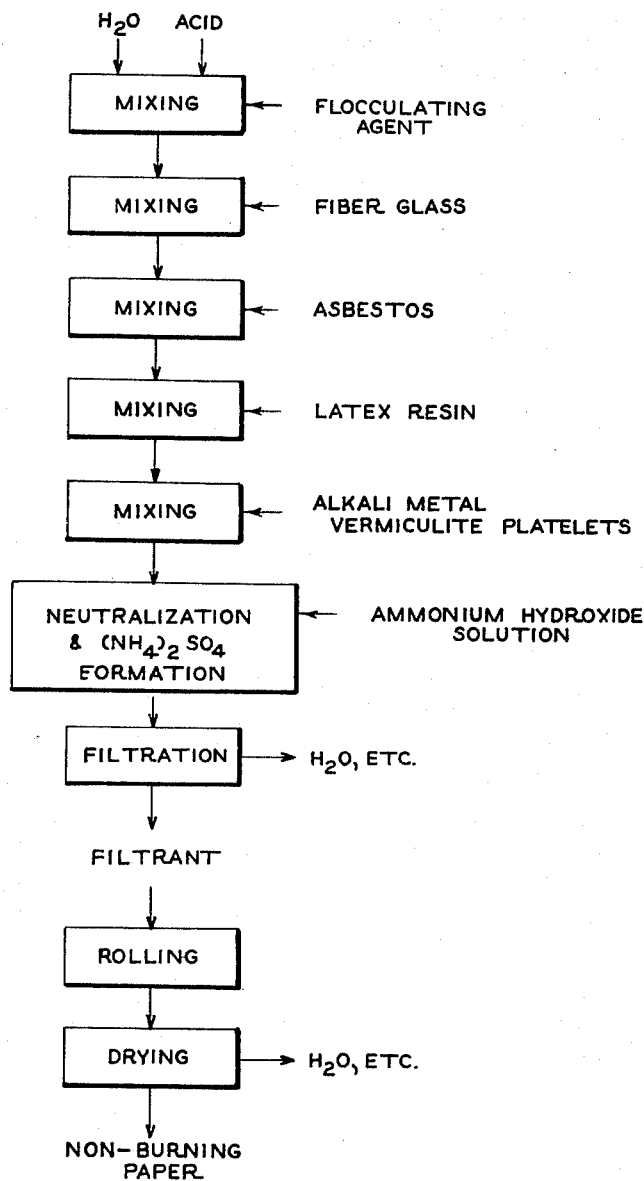

ABSTRACT OF THE DISCLOSURE

A nonburning paper which is suitable for printing, writing, etc. is disclosed. The basic ingredients of the nonburning paper are asbestos, fiber glass, a light metal vermiculite and a latex resin. The method of producing this nonburning paper, which will extinguish itself in pure oxygen, is as follows: an acidified aqueous solution of flocculating agents is prepared; fiber glass is added and admixed to the acidified solution to prepare a dispersion; asbestos is admixed with the fiber glass dispersion; a latex resin is admixed with the dispersion; a lithium vermiculite suspension is added to the dispersion; sufficient ammonium hydroxed is added to the dispersion to neutralize the acid present and to form ammonium sulfate which acts as a catalyst for curing the latex resin; the resultant dispersion is filtered; and the filtrate is removed, rolled and dried. The resultant sheet of paper is nonburning and, in those cases where its preparation is so tailored, it can be used as writing paper or can be used in a conventional printing press, such as, an offset lithographic printing press.

BACKGROUND OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

(1) Object of the invention

It is an objective of this invention to prepare paper-composed primarily of inorganic materials which is a nonburning paper and which is self-extinguishing in pure oxygen. It is another object of this invention to prepare a nonburning paper which can be written or printed upon. A still further object of this invention is to provide a nonburning paper which has high wet strength, is relatively chemically inert and which is relatively inexpensive to produce. These and other objectives and advantages of this invention will become more apparent from the following description, drawing and claims.

(2) Prior art

The preparation of sheets of inorganic silica fibers containing up to about 5 percent of a water-soluble polymeric substance has been described in U.S. Pat. No. 2,901,390. That process required that at least 20 percent of the water-soluble polymeric substance be N-vinyl-2-pyrrolidone. That patent also disclosed the addition of a water-soluble polymer containing at least 20 percent N-vinyl-2-pyrrolidone to asbestos fibers. At lines 38 through 43 in column 4 of said patent, it is disclosed that in place of the silica fibers or the glass fibers any natural inorganic substance can be utilized. A chemical "insolubilizing agent" may be added in amounts sufficient to effect the insolubilization of the polyvinyl pyrrolidone-containing polymeric material. The purpose of insolubilization of the polyvinyl pyrrolidone-containing polymeric substance is to insolubilize said substance on the asbestos, glass fiber, etc. Said insolubilization can be done on the substance by chemical means or by other means such as the use of elevated temperatures. The insolubilization of the polyvinyl pyrrolidone-containing polymeric substance can be by the addition of polymeric compound containing carboxyl or anhydride groups, such as, copolymerous styrene and maleic anhydride. It should be further stated that the patent disclosed that any other polyvinyl pyrrolidones can be used in place of the N-vinyl-2-pyrrolidone polymer.

An asbestos sheet material is disclosed in U.S. Pat. No. 2,567,558 wherein asbestos is bound in situ by means of a water-soluble, sulfite compound such as a solution of ammonium sulfate. The patent specifically eliminates the use of an organic binder and excludes all but minor contaminating portions of any such organic binder, relying primarily upon an inorganic binder such as named above. No more than 2 percent by weight organic binder is allowable in said asbestos sheets. The asbestos sheet may contain a minor quantity of a finely-divided filler material, e.g., a diatomaceous earth, talc, pigments, etc. U.S. Pat. No. 2,626,864 discloses a building board consisting essentially of fibers and of asphalt-coated, essentially-cellular, expanded pyrrolite. The fibers can be inorganic, such as asbestos, glass wool, rock wool, etc. U.S. Pat. No, 2,940,893 discloses a method of making a felted asbestos sheet containing chrysotile and crocidolite asbestos fibers and a synthetic rubber latex. The synthetic rubber latex can be a butadiene-styrene copolymer or a butadieneacrylonitrile copolymer.

A porous, flexible, asbestos-glass-fiber paper is described in U.S. Pat. No. 3,212,960. Said paper contains asbestos fibers, glass fibers, a thermoplastic resin binder and aluminum acid phosphate solids. The resinous binder can be an acrylic resin, such as one of the esters of acrylic acid. The aluminum acid phosphate is stated to react with the asbestos and possibly with some of the glass compositions. Its function, among other things, is to increase the wet strength of the resultant paper. In Example 1 of said patent, a series of papers were formulated and then certain other papers were dipped in aluminum acid phosphate aqueous solutions wherein the phosphate solids were picked up to a varying degree. Paper No. 3 of Example 1 was prepared and in one instance not dipped in the phosphate solids. Paper No. 3 contained 72 percent asbestos fibers, 25 percent fine glass fibers and 3 percent acrylic resin.

A noncombustible paper is disclosed in U.S. Pat. No. 3,148,108 which consists of asbestos dust and an adhesive binder (a plastic).

BROAD DESCRIPTION OF THE INVENTION

The method of this invention for preparing a writing paper that will not burn in air and that is self-extinguishing in pure oxygen includes, initially, preparing an acidified aqueous solution containing flocculating agents wherein fiber glass is dispersed. Asbestos is then added to the dispersed fiber glass and thoroughly admixed. A latex is then added to the dispersion and thoroughly admixed. The latex is absorbed onto the asbestos and hold the fiber glass and asbestos together. The latex, in general, can be any polymeric organic latex and, specifically, can be an acrylonitrile polymer, an acrylic polymer, a modified SBR rubber, a nitrile polymer, and/or a styrene polymer. Modified SBR rubber is styrene, butadiene and a small amount of acrylic acid. Lithium vermiculite platelets are admixed with the dispersion. The lithium vermiculite platelets can be added in solid or suspension form. The flocculating agents present in the dispersion cause the lithium vermiculite platelets to coalesce and precipitate on the asbestos and fiber glass, thereby firmly holding them in place. At this point, an ammonium hydroxide solution is added to neutralize the acid present in the dispersion and to produce the catalyst ammonium sulfate. The ammonium sulfate catalyzes the curing of the latex resin, thereby further binding the various components, etc. The paper sheets are prepared from the dispersion by any convenient method. The preferred method is to form the paper sheets on a filter plate by means of suction-filtration which essentially removes all of the liquid (water) components of the dispersion.

The resultant paper will not burn in air and is self-extinguishing in pure oxygen. In many cases, the paper has an Elmendorf tear strength of well over 100 grams per sheet. The resultant nonburning paper can readily be printed upon by convenient printing method, such as, a conventional offset multilith process. These and many other advantages of this invention will be readily apparent to one skilled in the art upon reading this invention.

This invention also involves the nonburning paper itself.

DETAILED DESCRIPTION OF THE INVENTION

The accompaying drawing (FIG. 1) is self-explanatory and is essentially a block-diagram flow sheet of the process of one of the embodiments of this invention.

The initial solution (dispersion) is acidified by any convenient acid, organic or inorganic. It is preferable to use the inorganic acid in order to minimize the organic content of the resultant nonburning paper. Convenient inorganic acids are the conventional, relatively inexpensive, acids, such as, sulfuric acid, hydrochloric acid, etc.

One or more flocculating agents may be added to the acidified aqueous solution. Any known conventional flocculating agent is useful within the scope of the invention, whether said flocculating agent be organic or inorganic. The inorganic flocculating agents are preferred because they minimize the organic content of the resulting nonburning paper. The preferred inorganic flocculating agents are $Ca(H_2PO_4)_2 \cdot H_2O$ and $MgCl_2 \cdot 6H_2O$. Other useful inorganic flocculating agents are potassium hydroxide, hydrochloric acid, various inorganic salts, mineral acids and bases. It is noted, for example, that the flocculating agent may also be the agent which is used to acidify the initial aqueous solution. Other preferred flocculating agents are aluminum sulfate, ferric sulfate, aluminum ammonium sulfate, and the dehydrated double sulfates of aluminum or univalent metals, such as potassium, sodium and ammonium, and such trivalent metals as iron and chromium. The term "alum" as used herein is restricted to aluminum sulfate itself or its hydrates. The flocculating agent tends to convert finely-divided or colloidally-dispersed suspensions of a solid into large size particles that can reasonably be filtrated out.

The fiber glass which is dispersed in the acidified aqueous solution by admixing the fiber glass and the acidified aqueous solution containing the flocculating agents is composed of a fibrous glass having a fine diameter. Preferably, the average cross-section dimension of the glass fibers is less than 3 microns and, even more preferably, in the range from about ½ to 1 micron. The length of the individual fibers of fiber glass can be any convenient length although it is preferred that the glass fibers be the length of about ¼ inch. The composition of the glass fibers is not normally an essential consideration. Normally, the glass should be a silicate-base glass, but other oxides, such as alumina-boric acid, lithium oxide, sodium oxide, potassium oxide, beryllium oxide, magnesium oxide, calcium oxide, barium oxide, lead oxide, zinc oxide, iron oxide, boron oxide, vanadium oxide, tellurium oxide, and germanium oxide may be utilized. The glass may contain any number of minor constituents which are normally utilized therein to affect the coloring, absorption characteristics, etc., and characteristics of the glass. Glass fibers are commercially available under the trade name "Fiberglas" from Owens-Corning Corp. The fiber glass may be added to an aqueous solution before admixing with the acidified aqueous solution (containing flocculating agents) in order to better disperse the individual glass fibers for a more uniform admixture. Other commercially-available fiber glasses are those available under the trade names "7900," "7913," and "8160" from Corning Glass Works, and those available under the trade names "E-Glass," "T-Glass," "C-Glass," "SF-Glass," and "S-Glass" from Owens-Corning Corp. The composition of said commercially-available glasses are found upon page 572 of volume 10 in Kirk-Othmer, Encyclopedia of Chemical Technology, 2nd editon, John Wiley & Sons, Inc., N.Y. (1966).

The asbestos fibers which are admixed with the acidified dispersion of fiber glass containing the flocculating agents can be any useful asbestos fibers. The preferred asbestos fibers are obtained from serpentine asbestos which is a mineral, chrysotile, a magnesium silicate. Other useful asbestos fibers are the amphibole asbestos which include the minerals tremolite, actinolite, amosite, crocidolite, and anthophyllite. The amphibole asbestoses are generally various silicates of magnesium, iron, calcium, and sodium. The allowable dimensions of the asbestos fibers are unlimited. The asbestos fibers should be added in a manner so that they do not contain any large bundles or groupings of asbestos fibers.

A latex resin is added to the asbestos and fiber glass dispersion to bind together the fiber glass and asbestos fibers. The latex resin is absorbed onto the asbestos. Useful latex resins which can be added to the dispersion are acrylic polymers, acrylonitrile polymers, SBR rubber, and styrene polymers. Useful water dispersions of various latex resins which are commercially available from B. F. Goodrich Chemical Co., are those commercially available under the trade name "Hycar" latex. The properties and trade names of the useful "Hycar" latices are given in Table I.

TABLE I

| Hycar Latex No. | Type | pH (average minutes at shipment) | Total solids (approx.), percent | Particle size (average), A. | Specific gravity of latex | Viscosity (average Brookfield LVF, #1 spindle, 60 r.p.m.), cps. | Approx. dry solids (wt. per drum), lb. |
|---|---|---|---|---|---|---|---|
| 1561 | High acrylonitrile | 9.5 | 41 | 500 | 1.00 | 27 | 175 |
| 1571 | do | 8.0 | 41 | 1,200 | 1.00 | 12 | 180 |
| 1552 | do | 9.0 | 53 | 1,800 | 0.99 | 43 | 230 |
| 1562 | do | 9.5 | 41 | 500 | 0.99 | 46 | 175 |
| 1572 | Medium acrylonitrile | 6.5 | 50 | 1,400 | 1.00 | 57 | 210 |
| 1577 | do | 9.5 | 40 | 400 | 1.01 | 36 | 180 |
| 1872 | do | 8.5 | 40 | 2,000 | 0.99 | 15 | 175 |
| 2508 | Terpolymer | 9.0 | 33 | 600 | 0.98 | 10 | 140 |
| 2570X2 | Modified SBR | 8.0 | 41 | 500 | 0.96 | 15 | 180 |
| 2570X5 | do | 6.5 | 41 | 500 | 0.96 | 15 | 180 |
| 2671 | Polyacrylic | 5.8 | 50 | 2,300 | 1.06 | 200 | 230 |
| 2601 | do | 6.5 | 50 | 1,600 | 1.06 | 30 | 230 |

In general, the latex polymer must be a water emulsion and can be present in an amount no greater than 15 percent by weight based on the solids and, preferably, no greater than about 1 percent by weight based on the solids (based upon the weight of the solids in a slurry, dispersion, etc.).

Lithium vermiculite platelets are added to the aqueous dispersion after the latex has been added to said dispersion. The term "vermiculite" as used herein refers to the group of rockforming mineral species characterized by a layer of laticized structure in which the silicate-layer units have a thickness of approximately 10 angstrom units. The main elements present in the layer are magnesium, aluminum, silica, iron and oxygen with the layers being separated by one or two sheets of water molecules associated with cations, such as magnesium, calcium, sodium and hydrogen. The layers have considerable lateral extent relative to the thickness of the basic 10-angstrom-unit layer. The term "vermiculite" as used herein therefore includes minerals consisting wholly or largely of vermiculite, or minerals of a mixed-layer type containing vermiculite layers as an important constituent, such as hydrobiotites, chlorite-vermiculites, but does not include minerals of the montmorillonite group. Among other functions which the vermiculite serves in the formation of this invention, it serves as an integral filling agent which gives a uniform and level surface to the resultant nonburning paper. The vermiculites which are useful within this invention include those in which the lithium has been cation-exchanged with the light metals of Group 1–A and 2–A of the Periodic Table of Elements. The preferred light metal is lithium, but other useful light metals include, for example, sodium, potassium, calcium, barium, magnesium, beryllium, etc.

The lithium vermiculite platelets useful in this invention can be prepared by the method disclosed in copending application Ser. No. 532,363; inventors: Kraus and Hurley; filed: Mar. 7, 1966; entitled: "Preparation of Vermiculite Paper." The method of preparing lithium vermiculite platelets or flakes useful in the nonburning paper of this invention involves treating vermiculite crystals (vermiculite ore) with an aqueous solution of a lithium salt, washing the treated vermiculite with an aqueous solution to remove any excess lithium chloride and then subjecting the washed lithium vermiculite to intense mechanical shearing in an aqueous solution to form a suspension of lithium vermiculite platelets or flakes. The lithium vermiculite platelets can then be dried and added to the aqueous dispersion of this invention or can be added thereto as an aqueous suspension. The resultant lithium vermiculite platelets have, in general, a length and breadth dimension not exceeding 100 microns and a thickness of, in general, 0.00001 to 0.0001 of said length and breadth dimensions. Another method for preparing lithium vermiculite platelets is disclosed in U.S. Pat. No. 3,325,340, which for purposes of preparation of said lithium vermiculite platelets is incorporated herein. Once said lithium vermiculite platelets are formed, said patent discloses that the lithium cations associated with the vermiculite platelets can be cation-exchanged in a solution, for example, of magnesium chloride, to replace said lithium cations with magnesium cations. It should be stated, at this point, that lithium chloride or other light metal chlorides, if such be the case, may be added to the dispersion when the flocculating agents are added thereto. This lithium-chloride addition is helpful in keeping the lithium vermiculite platelets in the lithium form.

Upon addition of the lithium vermiculite platelets to the aqueous dispersion, the flocculating agents cause the platelets to aggregate and coalesce tightly around the asbestos fibers and fiber glass, thereby firmly holding them in place. After the lithium vermiculite platelets are added to the dispersion, ammonium hydroxide is added to neutralize the acid present in the dispersion. This ammonium hydroxide addition produces the catalyst, ammonium sulfate, which acts as a catalyst for the further polymerization of the latex-resin binder.

The various solid materials in the aqueous dispersion are formulated into a layer of paper by any convenient method known in the paper-making art for removing water and other liquid constituents from the dispersion thereby forming a sheet or layer of paper. The preferred method is to remove the water by means of vacuum-filtration utilizing a Buchnel funnel (filter). After the water is removed by said filtration operation, the sheet which is formed on the filter plate is removed, rolled and dried. This paper can be used, for example, as card stock or it can be used as normal letter paper wherein writing can be placed upon or it can be printed upon in such a manner as in normal offset lithography or multilith. The resultant paper has extreme strength, for example, it normally has an Elmendorf tear strength in excess of 100 grams per sheet where the tear strength is made in the machine direction or parallel to the webbed formation. Even stronger tear strengths are obtained in cross-machine direction or where it is perpendicular to the webbed formation. The characteristics of the paper, such as bulk, absorptiveness, strength, etc., can be varied depending upon the means of sheet formation. Various coatings can be applied with the objective that the paper remains self-extinguishing in pure oxygen and will not burn in air.

Various materials may be added to the vermiculite paper prior and after the addition of the flocculating agents, provided such materials are compatible with the formation of a strong paper and one which contains the nonburning characteristics which is an objective of this invention. For example, fillers, such as montmorillonite clays, may be added.

By way of summation, the critical components of this invention must be present in the following amounts: (a) about 5 to about 60 parts by weight fiber glass; (b) about 5 to about 40 parts by weight asbestos; (c) about 2 to about 10 parts by weight latex resin; and (d) about 10 to about 80 parts by weight light metal vermiculite platelets. Also present as a critical agent must be about 0.01 to about 1 part by weight of at least one flocculating agent based upon the 100 parts of (a), (b), (c) and (d) above. Also about 0.001 to about 0.1 part by weight of a light metal chloride, such as lithium chloride, may be added. The amount of ammonium hydroxide necessary which can be added is that amount which is necessary to neutralize the acid components of the dispersion, and to form said ammonium sulfate catalyst.

This invention is illustrated, but not limited, by the following specific examples.

EXAMPLE 1

4 ml. of concentrated sulfuric acid, 2.9 grams of $Ca(H_2PO_4)_2 \cdot H_2O$ and 0.4 gram of $MgCl_2 \cdot 6H_2O$ and 0.2 gram Li were admixed in two gallons of water. Two quarts of acidified water containing the flocculants were placed in a Waring Blendor with 5.0 grams of serpentine asbestos and were thoroughly admixed. One gram of "Hycar 2671" (50 percent solids) were added to the asbestos slurry and thoroughly admixed to obtain a creamy slurry. 5 grams of "beta-Fiberglas" (¼ inch length) were added to the remaining approximately 1.5 gallons acidified water and were admixed thoroughly until the fibers were separated. "Beta-Fiberglas" is the trade designation for a glass fiber which is commercially available from Owens-Corning Corp. The asbestos slurry was then added to the water containing the fiber glass which was thoroughly admixed.

A 200-gram sample of No. 5 vermiculite ore was steeped for 24 hours in 260 ml. of a 20 percent aqueous lithium chloride solution. The treated vermiculite ore was then diluted with 500 ml. of water and centrifuged. The solids were then washed five times with 600 ml. of water. Between each of the washing and rinsing steps, the solids were separated from the suspended medium by centrifugation. After the final wash, the lithium vermiculite solids were placed in excess water and subjected to high shear in a Waring Blendor. The concentration of the sheared vermiculite platelets was then adjusted to 1.5 weight percent by the addition of water. Sufficient lithium vermiculite platelets solution to comprise 5 grams as solids was added to the water dispersion of asbestos and fiber glass and thoroughly admixed. 9 ml. of concentrated ammonium hydroxide were added to the dispersion and the dispersion was thoroughly admixed. The water portion of the dispersion was then removed by filtration through a 12-ml. Buchner funnel. The excess water in the filtrate was removed by suction (26 inches vacuum). The filtrate sheet was removed, rolled and dried. The resulting paper was 0.015 inch thick and had a tear strength (parallel to the webbed formation) in excess of 100 grams. The resultant sheet could be used as a card stock and was nonburning in air and was self-extinguishing in pure oxygen.

EXAMPLE 2

2 ml. of concenrated sulfuric acid; 1.44 gram of $$Ca(H_2PO_4)_2 \cdot H_2O$$

0.2 gram $MgCl_2 \cdot 6H_2O$ and 0.1 gram LiCl were added to one gallon of water. One quart of the acidified, aqueous solution of flocculants was removed and placed in a Waring Blendor with 1.25 gram of asbestos and thoroughly admixed. 0.2 gram of "Hycar 2671" (50 percent solids) was added to the serpentine asbestos and the dispersion was thoroughly admixed. 1.25 gram of "beta-Fiberglas" (¼ inch length) was added to the remaining approximately 0.75 gallon of water and thoroughly mixed until the fibers separated. The asbestos slurry was added to the fiber glass slurry and thoroughly admixed. Sufficient lithium vermiculite, prepared in Example 1, to consist of 1.5 gram of solids was added to the dispersion and thoroughly mixed. 4.7 ml. of concentrated ammonium hydroxide were added to the dispersion and the dispersion was thoroughly admixed. The water was removed from the dispersion by filtration through a 12-inch-diameter Buchner funnel. The excess water was removed from the filtrate by suction (26 inches vacuum). The resultant sheet was removed, rolled and dried. The resultant sheet was 0.004 of an inch thick and had a tear strength of 100 grams in the direction of the web. The resultant paper was of the normal writing letter quality, was nonburning in air and was self-extinguishing in pure oxygen. The resultant sheet was a slight off-grey in color.

EXAMPLE 3

The paper which resulted from Example 2 was placed in an offset lithographic machine and was printed upon—producing excellent copy.

EXAMPLE 4

Example 1 was repeated, except that the latex was "Hycar 2570×5" (a modified SBR rubber) (1.5 gram, 41 percent solids). 9 ml. of $NH_4OH$ was used. The resultant sheet was nonburning in air and was self-extinguishing in pure oxygen.

EXAMPLE 5

Example 1 was repeated, except that the latex was "Hycar 2601" (2 grams). 9 ml. of $NH_4OH$ was used. The resultant sheet was nonburning in air and was self-extinguishing in pure oxygen.

EXAMPLE 6

Example 1 was repeated, except that the latex was "Hycar 2570×2" (1 gram). 9 ml. of $NH_4OH$ was used. The resultant sheet was nonburning in air and was self-extinguishing in pure oxygen.

EXAMPLE 7

Example 1 was repeated, except that the latex was "Hycar 1561" (3 grams). 9 ml. of $NH_4OH$ was used. The resultant sheet was nonburning in air and was self-extinguishing in pure oxygen.

EXAMPLE 8

Example 1 was repeated, except that the latex was "Hycar 1571" (2 grams). 9 ml. of $NH_4OH$ was used. The resultant sheet was nonburning in air and was self-extinguishing in pure oxygen.

EXAMPLE 9

Example 1 was repeated, except that the latex was "Hycar 1572" (3 grams). 9 ml. of $NH_4OH$ was used. The resultant sheet was nonburning in air and was self-extinguishing in pure oxygen.

EXAMPLE 10

Example 1 was repeated, except that the sulfuric acid was replaced with 9 ml. of hydrochloric acid. The resultant sheet was nonburning in air and was self-extinguishing in pure oxygen.

EXAMPLE 11

Example 1 was repeated, except that the sulfuric acid and flocculating agents were replaced with 9 ml. of hydrochloric acid. The resultant sheet was nonburning in air and was self-extinguishing in pure oxygen.

EXAMPLE 12

Example 1 was repeated, except that the flocculating agent was potassium hydroxide (1.1 gram). 9 ml. of $NH_4OH$ was used. The resultant sheet was nonburning in air and was self-extinguishing in pure oxygen.

EXAMPLE 13

Example 1 was repeated, except that the flocculating agent was aluminum ammonium sulfate (1.2 gram). The resultant sheet was nonburning in air and was self-extinguishing in pure oxygen.

EXAMPLE 14

Example 1 was repeated, except that the latex was a styrene butadiene vinyl peridine polymer ("Hycar 2508"). The resultant sheet was nonburning in air and was self-extinguishing in pure oxygen.

EXAMPLE 15

Example 2 was repeated, except that the fiber glass that was added was "E-Glass" (1.25 gram). The resultant sheet was nonburning in air and was self-extinguishing in pure oxygen.

EXAMPLE 16

Example 1 was repeated, except that aluminum sulfate (2 grams) was used as the flocculating agent. The resultant sheet was nonburning in air and was self-extinguishing in pure oxygen.

EXAMPLE 17

Example 1 was repeated, except that amphibole asbestos (tremolite) was used. The resultant sheet was nonburning in air and was self-extinguishing in pure oxygen.

EXAMPLE 18

Example 1 was repeated, except that beryllium vermiculite (10 grams) was used. The resultant sheet was nonburning in air and was self-extinguishing in pure oxygen.

EXAMPLE 19

Example 1 was repeated, except that potassium vermiculite (12 grams) was used. The resultant sheet was nonburning in air and was self-extinguishing in pure oxygen.

EXAMPLE 20

Example 2 was repeated, except that barium vermiculite (1.8 gram) was used. The resultant sheet was nonburning in air and was self-extinguishing in pure oxygen.

EXAMPLE 21

Example 2 was repeated, except that "Geon latex 577" (vinyl chloride-acrylic copolymer) was used. The resultant sheet was nonburning in air and was self-extinguishing in pure oxygen.

EXAMPLE 22

Example 2 was repeated, except that "Geon latex 652" (vinyl chloride-vinylidene chloride copolymer) was used. The resultant sheet was nonburning in air and was self-extinguishing in pure oxygen.

It is claimed:
1. A method for the preparation of a nonburning paper which can be written and printed upon which comprises:
   (a) preparing an acidified aqueous solution acidified by a member of the group consisting of hydrochloric acid and sulfuric acid and containing a flocculating agent;

(b) preparing a first dispersion of 5–60 parts fiber glass in said acidified aqueous solution by admixing the fiber glass and said acidified aqueous solution;

(c) preparing a second dispersion by admixing 5–40 parts asbestos with said first dispersion;

(d) preparing a third dispersion by admixing 2–10 parts of a latex resin, selected from the group consisting of an acrylic polymer, an acrylonitrile polymer, an SBR rubber and a styrene polymer, with the second dispersion, whereby the latex resin binds together the fiber glass and asbestos;

(e) preparing a fourth dispersion by admixing 10–80 parts lithium vermiculite platelets with said third dispersion, (f) preparing a fifth dispersion by adding sufficient ammonium hydroxide to neutralize said fourth dispersion thereby forming an ammonium salt; and (g) removing the water from said fifth dispersion in such a manner that a sheet of said nonburning paper is formed, said parts being parts by weight and the flocculating agent being present in an amount of 0.01–1 part per 100 parts of fiber glass, asbestos, latex resin and vermiculite.

2. The method as described in claim 1 wherein the flocculating agent is an inorganic flocculating agent.

3. The method as described in claim 1 wherein the flocculating agent is selected from the group consisting of $Ca(H_2PO_4)_2 \cdot H_2O$ and $MgCl_2 \cdot 6H_2O$.

4. The method as described in claim 1 wherein lithium chloride is added along with said flocculating agents.

5. The method as described in claim 1 wherein the fiber glass is added to an aqueous solution before it is admixed with the acidified aqueous solution containing the flocculating agents.

6. The method as described in claim 1 wherein said asbestos is selected from the group consisting of serpentine asbestos and amphibole asbestos.

7. The process as described in claim 1 wherein the lithium vermiculite platelets are added as a solid.

8. The process as described in claim 1 wherein the lithium vermiculite platelets are added as an aqueous suspension.

9. The method as described in claim 1 wherein the lithium vermiculite platelets are formed, before admixing with the polymer-containing dispersion, by immersing vermiculite ore in a solution of lithium chloride, draining and washing of excess lithium chloride solution, immersing the said treated vermiculite ore in water to effect expansion of said vermiculite, and subjecting said expanded vermiculite to intense mechanical shearing to form a suspension of vermiculite platelets.

10. The method as described in claim 1 wherein the lithium vermiculite platelets are formed, before admixing with the polymer-containing dispersion, by immersing the vermiculite ore in a first solution of sodium chloride, draining and washing of excess sodium chloride solution, immersing the vermiculite ore in a second solution of lithium chloride, draining and washing of excess lithium chloride solution, immersing the said treated vermiculite ore in water to effect expansion of said vermiculite, and subjecting said expanded vermiculite to intense mechanical shearing to form a suspension of vermiculite platelets.

11. The method as described in claim 1 wherein the water is removed from said fifth dispersion by means of suction-filtration whereby the filtrate forms a sheet of nonburning paper.

References Cited

UNITED STATES PATENTS

| | | | |
|---|---|---|---|
| 2,971,907 | 2/1961 | Smith | 162—145 X |
| 3,153,610 | 10/1964 | Heiser et al. | 162—155 |
| 3,434,917 | 3/1969 | Krause et al. | 162—145 X |

S. LEON BASHORE, Primary Examiner

T. G. SCAVONE, Assistant Examiner

U.S. Cl. X.R.

162—155, 156, 159, 164